US011016197B1

(12) United States Patent
Barber et al.

(10) Patent No.: US 11,016,197 B1
(45) Date of Patent: May 25, 2021

(54) LIDAR SYSTEM

(71) Applicant: Aurora Innovation, Inc., Palo Alto, CA (US)

(72) Inventors: Zeb William Barber, Bozeman, MT (US); Stephen C. Crouch, Bozeman, MT (US); Ryan Moore Galloway, Bozeman, MT (US); Edward Joseph Angus, Bozeman, MT (US); Emil Kadlec, Bozeman, MT (US)

(73) Assignee: AURORA INNOVATION, INC., Palo Alto, CA (US)

( * ) Notice: Subject to any disclaimer, the term of this patent is extended or adjusted under 35 U.S.C. 154(b) by 0 days.

(21) Appl. No.: 16/915,045

(22) Filed: Jun. 29, 2020

(51) Int. Cl.
*G01S 17/931* (2020.01)
*G01S 7/48* (2006.01)
*G01S 7/4865* (2020.01)
*G01S 17/32* (2020.01)

(52) U.S. Cl.
CPC .......... *G01S 17/931* (2020.01); *G01S 7/4804* (2013.01); *G01S 7/4865* (2013.01); *G01S 17/32* (2013.01)

(58) Field of Classification Search
CPC .......... G06K 7/10603; G06K 7/10613; G06K 7/10623; G01S 17/931; G01S 7/4804; G01S 17/32; G01S 7/4865
See application file for complete search history.

(56) References Cited

U.S. PATENT DOCUMENTS

| | | | | |
|---|---|---|---|---|
| 3,483,511 A * | 12/1969 | Rabinow | ............ | G06K 7/10831 382/296 |
| 3,947,816 A * | 3/1976 | Rabedeau | .......... | G06K 7/10871 235/462.4 |
| 4,140,903 A * | 2/1979 | Clark | .................. | G02B 26/121 250/236 |
| 5,646,765 A * | 7/1997 | Laakmann | ........... | G02B 26/101 250/234 |
| 5,892,575 A * | 4/1999 | Marino | ..................... | G01C 3/08 356/141.4 |
| 10,003,168 B1 * | 6/2018 | Villeneuve | ............. | G02B 27/10 |
| 10,042,159 B2 * | 8/2018 | Dussan | .................. | G02B 27/14 |
| 10,495,757 B2 * | 12/2019 | Dussan | .................... | G01S 17/89 |
| 2005/0099637 A1 * | 5/2005 | Kacyra | ................. | G01B 11/002 356/601 |
| 2005/0173770 A1 * | 8/2005 | Linden | ............... | G02B 26/0841 257/414 |
| 2010/0053715 A1 * | 3/2010 | O'Neill | ................. | G01S 7/4817 359/199.3 |
| 2011/0298820 A1 * | 12/2011 | Hajjar | .................. | G09G 3/2003 345/619 |
| 2016/0047895 A1 * | 2/2016 | Dussan | .................. | G01S 17/89 356/4.01 |
| 2016/0191870 A1 * | 6/2016 | Hajjar | .................. | H04N 9/3132 353/31 |

(Continued)

FOREIGN PATENT DOCUMENTS

WO WO-2018/107237 A1 6/2018

*Primary Examiner* — Hovhannes Baghdasaryan
(74) *Attorney, Agent, or Firm* — Foley & Lardner LLP

(57) ABSTRACT

A LIDAR system includes a laser source, a first scanner, and a second scanner. The first scanner receives a first beam from the laser source and applies a first angle modulation to the first beam to output a second beam at a first angle. The second scanner receives the second beam and applies a second angle modulation to the second beam to output a third beam at a second angle.

20 Claims, 12 Drawing Sheets

(56) References Cited

U.S. PATENT DOCUMENTS

| | | |
|---|---|---|
| 2017/0299697 A1 | 10/2017 | Swanson |
| 2017/0346347 A1* | 11/2017 | Abiri ................. H02J 50/50 |
| 2019/0212419 A1* | 7/2019 | Jeong ................. G01S 17/08 |
| 2020/0256960 A1* | 8/2020 | LaChapelle .......... G01S 7/4817 |

* cited by examiner

LIDAR SYSTEM

BACKGROUND

Optical detection of range using lasers, often referenced by a mnemonic, LIDAR, for light detection and ranging, also sometimes called laser RADAR, is used for a variety of applications, from altimetry, to imaging, to collision avoidance. LIDAR provides finer scale range resolution with smaller beam sizes than conventional microwave ranging systems, such as radio-wave detection and ranging (RADAR).

SUMMARY

At least one aspect relates to a light detection and ranging (LIDAR) system. The LIDAR system includes a laser source, a first scanner, and a second scanner. The first scanner receives a first beam from the laser source and applies a first angle modulation to the first beam to output a second beam at a first angle. The second scanner receives the second beam and applies a second angle modulation to the second beam to output a third beam at a second angle.

At least one aspect relates to an autonomous vehicle control system. The autonomous vehicle control system includes a first scanner, a second scanner, one or more detectors, and one or more processors. The first scanner receives a first beam from the laser source and applies a first angle modulation to the first beam to output a second beam at a first angle. The second scanner receives the second beam and applies a second angle modulation to the second beam to output a third beam at a second angle. The one or more detectors receive a return beam from an object responsive to the third beam and output a signal responsive to the return beam. The one or more processors are configured to determine at least one of a range to or a velocity of the object using the signal, and control operation of an autonomous vehicle responsive to the at least one of the range or the velocity.

At least one aspect relates to an autonomous vehicle. The autonomous vehicle includes a LIDAR system, at least one of a steering system or a braking system, and a vehicle controller. The LIDAR system includes a laser source, a first scanner that receives a first beam from the laser source and applies a first angle modulation to the first beam to output a second beam at a first angle, and a second scanner that receives the second beam and applies a second angle modulation to the second beam to output a third beam at a second angle. The vehicle controller includes one or more processors configured to determine at least one of a range to or a velocity of the object using the signal, and control operation of an autonomous vehicle responsive to the at least one of the range or the velocity.

Those skilled in the art will appreciate that the summary is illustrative only and is not intended to be in any way limiting. Any of the features described herein may be used with any other features, and any subset of such features can be used in combination according to various embodiments. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Implementations are illustrated by way of example, and not by way of limitation, in the figures of the accompanying drawings in which like reference numerals refer to similar elements and in which.

DETAILED DESCRIPTION

A LIDAR system can generate and transmit a light beam that an object can reflect or otherwise scatter as a return beam corresponding to the transmitted beam. The LIDAR system can receive the return beam, and process the return beam or characteristics thereof to determine parameters regarding the object such as range and velocity. The LIDAR system can apply various frequency or phase modulations to the transmitted beam, which can facilitate relating the return beam to the transmitted beam in order to determine the parameters regarding the object.

Due to factors such as the relative velocities of the LIDAR system—such as if the LIDAR system is implemented by an autonomous vehicle—and the object from which the return beam is received, the position of the LIDAR system may change between when the transmitted beam is outputted and the return beam is received. The position may change to an extent that it can become difficult to accurately determine the parameters regarding the object using the transmitted beam and the return beam. This may become notable in applications such as autonomous trucking, in which the LIDAR system may be expected to determine range and velocity of objects at relatively long range (e.g., on the order of 300 meters or further).

Systems and methods in accordance with the present disclosure can improve how the LIDAR system determines parameters regarding the object by using at least two scanning devices to control characteristics of the transmitted beam, such as angle (e.g., azimuth angle in an azimuthal plane), to better relate the transmitted beam and the return beam with each other. For example, the scanning devices can be selected and controlled to generate a transmitted beam that can be backscanned, such as by having an angle as a function of time that approximates a step function. This can improve the ability of the LIDAR system to accurately determine parameters regarding the object using the transmitted beam and the return beam and thus improve characteristics of the LIDAR system such as signal to noise ratio, maximum range, and effective duty cycle.

1. System Environments for Autonomous Vehicles

Figure 1A:
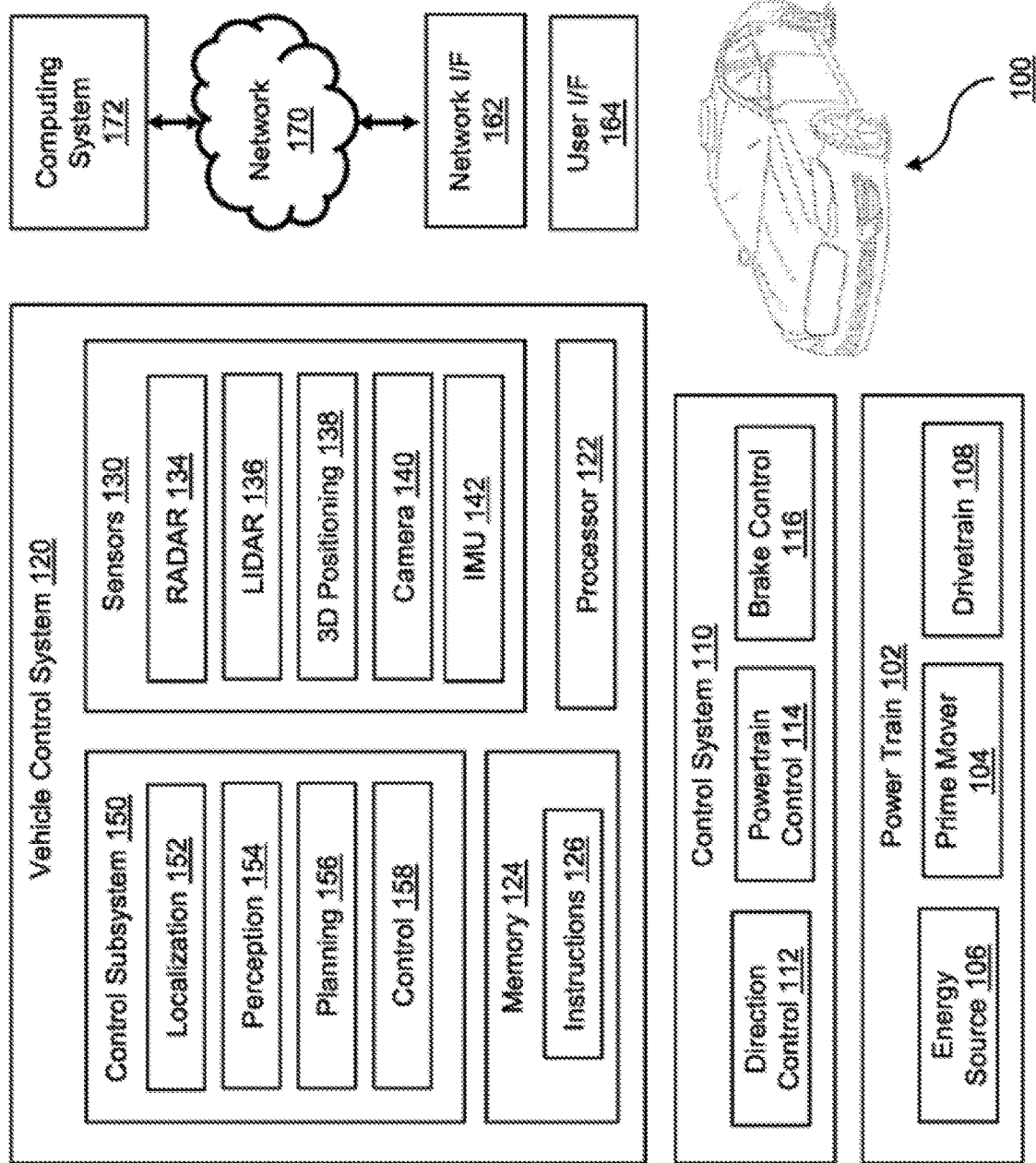
FIG. 1A is a block diagram of an example of a system environment for autonomous vehicles.

FIG. 1A is a block diagram illustrating an example of a system environment for autonomous vehicles according to some implementations. FIG. 1A depicts an example autonomous vehicle 100 within which the various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling in various environments. The aforementioned components 102-116 can vary widely based upon the type of vehicle within which these components are utilized, such as a wheeled land vehicle such as a car, van, truck, or bus. The prime mover 104 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 108 can include wheels and/or tires along with a transmission and/or any other mechanical drive components to convert the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, may utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers.

Various levels of autonomous control over the vehicle 100 can be implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)")) and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, LIDAR (Light Detection and Ranging) sensor 136, a 3D positioning sensors 138, e.g., any of an accelerometer, a gyroscope, a magnetometer, or a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 100. Each sensor 130 can output sensor data at various data rates, which may be different than the data rates of other sensors 130.

The outputs of sensors 130 may be provided to a set of control subsystems 150, including a localization subsystem 152, a planning subsystem 156, a perception subsystem 154, and a control subsystem 158. The localization subsystem 152 can perform functions such as precisely determining the location and orientation (also sometimes referred to as "pose") of the vehicle 100 within its surrounding environment, and generally within some frame of reference. The location of an autonomous vehicle can be compared with the location of an additional vehicle in the same environment as part of generating labeled autonomous vehicle data. The perception subsystem 154 can perform functions such as detecting, tracking, determining, and/or identifying objects within the environment surrounding vehicle 100. A machine learning model in accordance with some implementations can be utilized in tracking objects. The planning subsystem 156 can perform functions such as planning a trajectory for vehicle 100 over some timeframe given a desired destination as well as the static and moving objects within the environment. A machine learning model in accordance with some implementations can be utilized in planning a vehicle trajectory. The control subsystem 158 can perform functions such as generating suitable control signals for controlling the various controls in the vehicle control system 120 in order to implement the planned trajectory of the vehicle 100. A machine learning model can be utilized to generate one or more signals to control an autonomous vehicle to implement the planned trajectory.

Multiple sensors of types illustrated in FIG. 1A can be used for redundancy and/or to cover different regions around a vehicle, and other types of sensors may be used. Various types and/or combinations of control subsystems may be used. Some or all of the functionality of a subsystem 152-158 may be implemented with program code instructions 126 resident in one or more memories 124 and executed by one or more processors 122, and these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

Various architectures, including various combinations of software, hardware, circuit logic, sensors, and networks, may be used to implement the various components illustrated in FIG. 1A. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors illustrated in FIG. 1A, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 100 may include a user interface 164 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 100 may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 100 receives environmental and other data for use in autonomous control thereof. Data collected by the one or more sensors 130 can be uploaded to a computing system 172 via the network 170 for additional processing. In some implementations, a time stamp can be added to each instance of vehicle data prior to uploading.

Each processor illustrated in FIG. 1A, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code can include one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. Any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), the present disclosure is not limited to the specific organization and allocation of program functionality described herein.

2. LIDAR for Automotive Applications

Figure 2A:
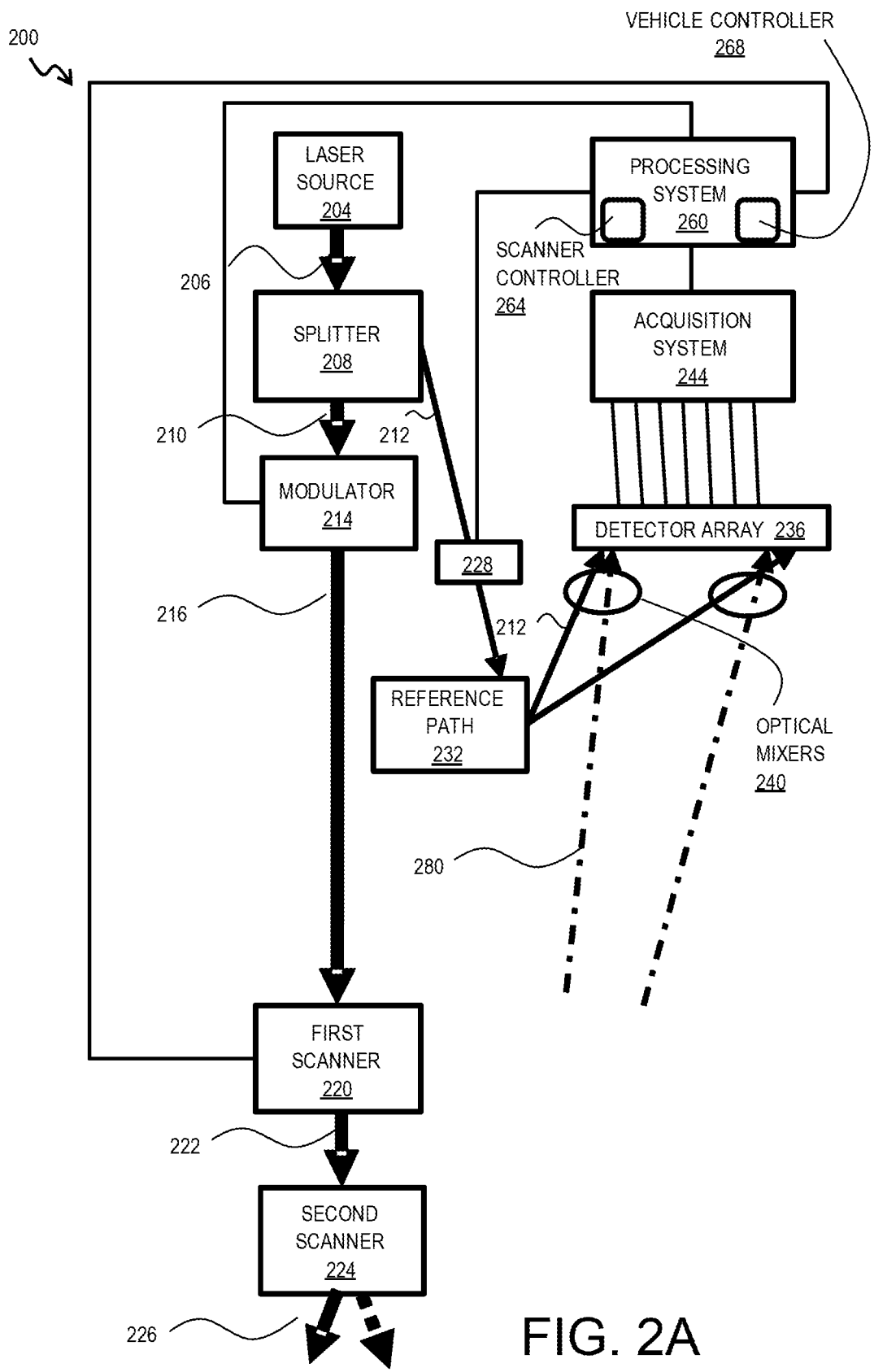
FIG. 2A is a block diagram of an example of a LIDAR system.

A truck can include a LIDAR system (e.g., vehicle control system 120 in FIG. 1A, LIDAR system 200 in FIG. 2A, among others described herein). In some implementations, the LIDAR system can use frequency modulation to encode an optical signal and scatter the encoded optical signal into free-space using optics. By detecting the frequency differences between the encoded optical signal and a returned signal reflected back from an object, the frequency modulated (FM) LIDAR system can determine the location of the object and/or precisely measure the velocity of the object using the Doppler effect. In some implementations, an FM LIDAR system may use a continuous wave (referred to as, "FMCW LIDAR") or a quasi-continuous wave (referred to as, "FMQW LIDAR"). In some implementations, the LIDAR system can use phase modulation (PM) to encode an optical signal and scatters the encoded optical signal into free-space using optics.

In some instances, an object (e.g., a pedestrian wearing dark clothing) may have a low reflectivity, in that it only reflects back to the sensors (e.g., sensors 130 in FIG. 1A) of the FM or PM LIDAR system a low amount (e.g., 10% or less) of the light that hit the object. In other instances, an object (e.g., a shiny road sign) may have a high reflectivity (e.g., above 10%), in that it reflects back to the sensors of the FM LIDAR system a high amount of the light that hit the object.

Regardless of the object's reflectivity, an FM LIDAR system may be able to detect (e.g., classify, recognize, discover, etc.) the object at greater distances (e.g., 2×) than a conventional LIDAR system. For example, an FM LIDAR system may detect a low reflectively object beyond 300 meters, and a high reflectivity object beyond 400 meters.

To achieve such improvements in detection capability, the FM LIDAR system may use sensors (e.g., sensors 130 in FIG. 1A). In some implementations, these sensors can be single photon sensitive, meaning that they can detect the smallest amount of light possible. While an FM LIDAR system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5600 nm; and far infrared: 5600 nm-1,000,000 nm). By operating the FM or PM LIDAR system in infrared wavelengths, the FM or PM LIDAR system can broadcast stronger light pulses or light beams while meeting eye safety standards. Conventional LIDAR systems are often not single photon sensitive and/or only operate in near infrared wavelengths, requiring them to limit their light output (and distance detection capability) for eye safety reasons.

Thus, by detecting an object at greater distances, an FM LIDAR system may have more time to react to unexpected obstacles. Indeed, even a few milliseconds of extra time could improve safety and comfort, especially with heavy vehicles (e.g., commercial trucking vehicles) that are driving at highway speeds.

The FM LIDAR system can provide accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in FMCW, PMCW, or FMQW LIDAR systems, the signal can be converted to the RF domain such that the frequency shift can be calculated using various signal processing techniques. This enables the autonomous vehicle control system to process incoming data faster.

Instantaneous velocity calculation also makes it easier for the FM LIDAR system to determine distant or sparse data points as objects and/or track how those objects are moving over time. For example, an FM LIDAR sensor (e.g., sensors 130 in FIG. 1A) may only receive a few returns (e.g., hits) on an object that is 300 m away, but if those return give a velocity value of interest (e.g., moving towards the vehicle at >70 mph), then the FM LIDAR system and/or the autonomous vehicle control system may determine respective weights to probabilities associated with the objects.

Faster identification and/or tracking of the FM LIDAR system gives an autonomous vehicle control system more time to maneuver a vehicle. A better understanding of how fast objects are moving also allows the autonomous vehicle control system to plan a better reaction.

The FM LIDAR system can have less static compared to conventional LIDAR systems. That is, the conventional LIDAR systems that are designed to be more light-sensitive typically perform poorly in bright sunlight. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional LIDAR systems often need extra hardware, complex software, and/or more computational power to manage this "noise."

In contrast, FM LIDAR systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM LIDAR systems produce (e.g., generates, derives, etc.) more accurate data with less hardware or software requirements, enabling safer and smoother driving.

The FM LIDAR system can be easier to scale than conventional LIDAR systems. As more self-driving vehicles (e.g., cars, commercial trucks, etc.) show up on the road, those powered by an FM LIDAR system likely will not have to contend with interference issues from sensor crosstalk. Furthermore, an FM LIDAR system uses less optical peak power than conventional LIDAR sensors. As such, some or all of the optical components for an FM LIDAR can be produced on a single chip, which produces its own benefits, as discussed herein.

2.1 Commercial Trucking

Figure 1B:
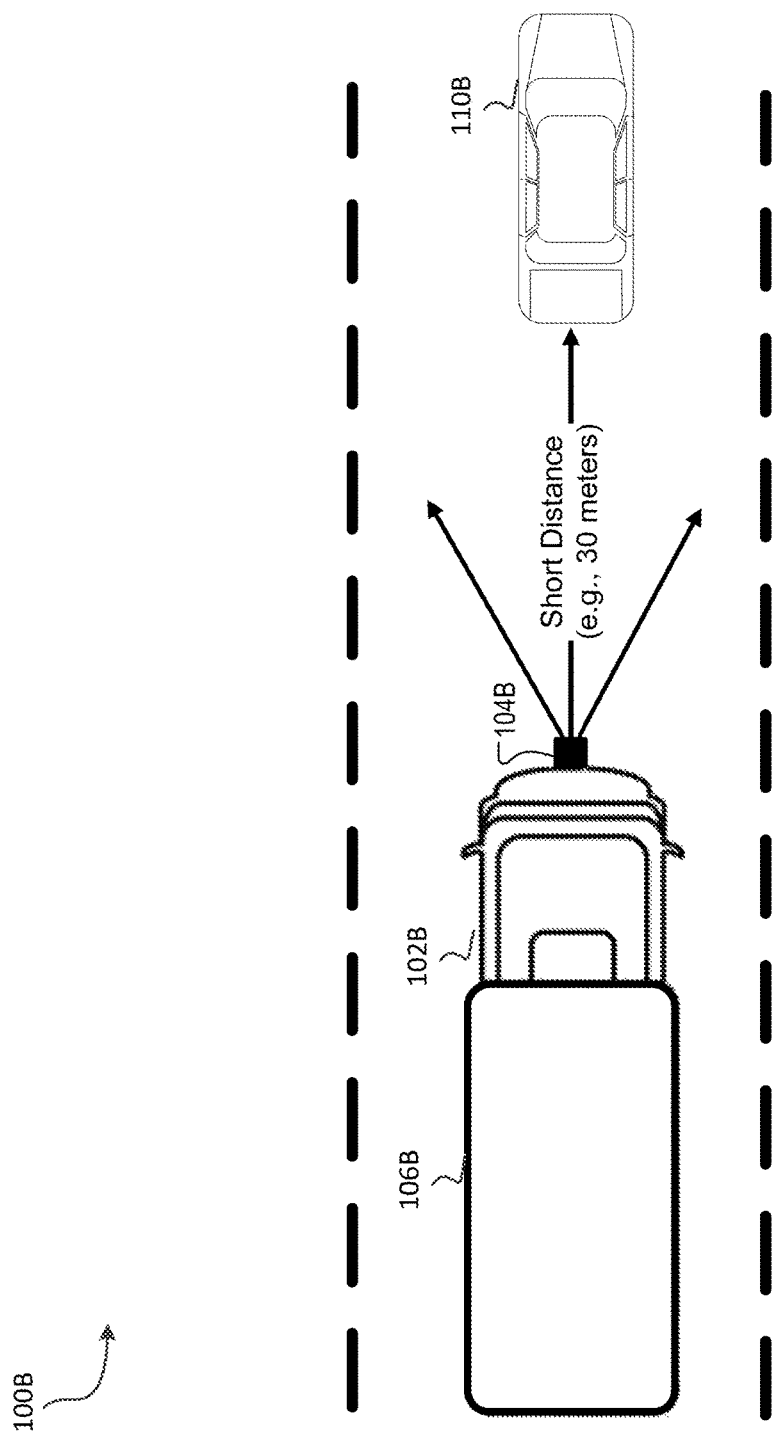
FIG. 1B is a block diagram of an example of a system environment for autonomous commercial trucking vehicles.

FIG. 1B is a block diagram illustrating an example of a system environment for autonomous commercial trucking vehicles, according to some implementations. The environment 100B includes a commercial truck 102B for hauling cargo 106B. In some implementations, the commercial truck 102B may include vehicles configured to long-haul freight transport, regional freight transport, intermodal freight transport (i.e., in which a road-based vehicle is used as one of multiple modes of transportation to move freight), and/or any other road-based freight transport applications. In some implementations, the commercial truck 102B may be a flatbed truck, a refrigerated truck (e.g., a reefer truck), a vented van (e.g., dry van), a moving truck, etc. In some implementations, the cargo 106B may be goods and/or produce. In some implementations, the commercial truck 102B may include a trailer to carry the cargo 106B, such as a flatbed trailer, a lowboy trailer, a step deck trailer, an extendable flatbed trailer, a sidekit trailer, etc.

The environment 100B includes an object 110B (shown in FIG. 1B as another vehicle) that is within a distance range that is equal to or less than 30 meters from the truck.

The commercial truck 102B may include a LIDAR system 104B (e.g., an FM LIDAR system, vehicle control system 120 in FIG. 1A, LIDAR system 200 in FIG. 2A) for determining a distance to the object 110B and/or measuring the velocity of the object 110B. Although FIG. 1B shows that one LIDAR system 104B is mounted on the front of the commercial truck 102B, the number of LIDAR system and the mounting area of the LIAR system on the commercial truck are not limited to a particular number or a particular area. The commercial truck 102B may include any number of LIDAR systems 104B (or components thereof, such as sensors, modulators, coherent signal generators, etc.) that are mounted onto any area (e.g., front, back, side, top, bottom, underneath, and/or bottom) of the commercial truck 102B to facilitate the detection of an object in any free-space relative to the commercial truck 102B.

As shown, the LIDAR system 104B in environment 100B may be configured to detect an object (e.g., another vehicle, a bicycle, a tree, street signs, potholes, etc.) at short distances (e.g., 30 meters or less) from the commercial truck 102B.

Figure 1C:
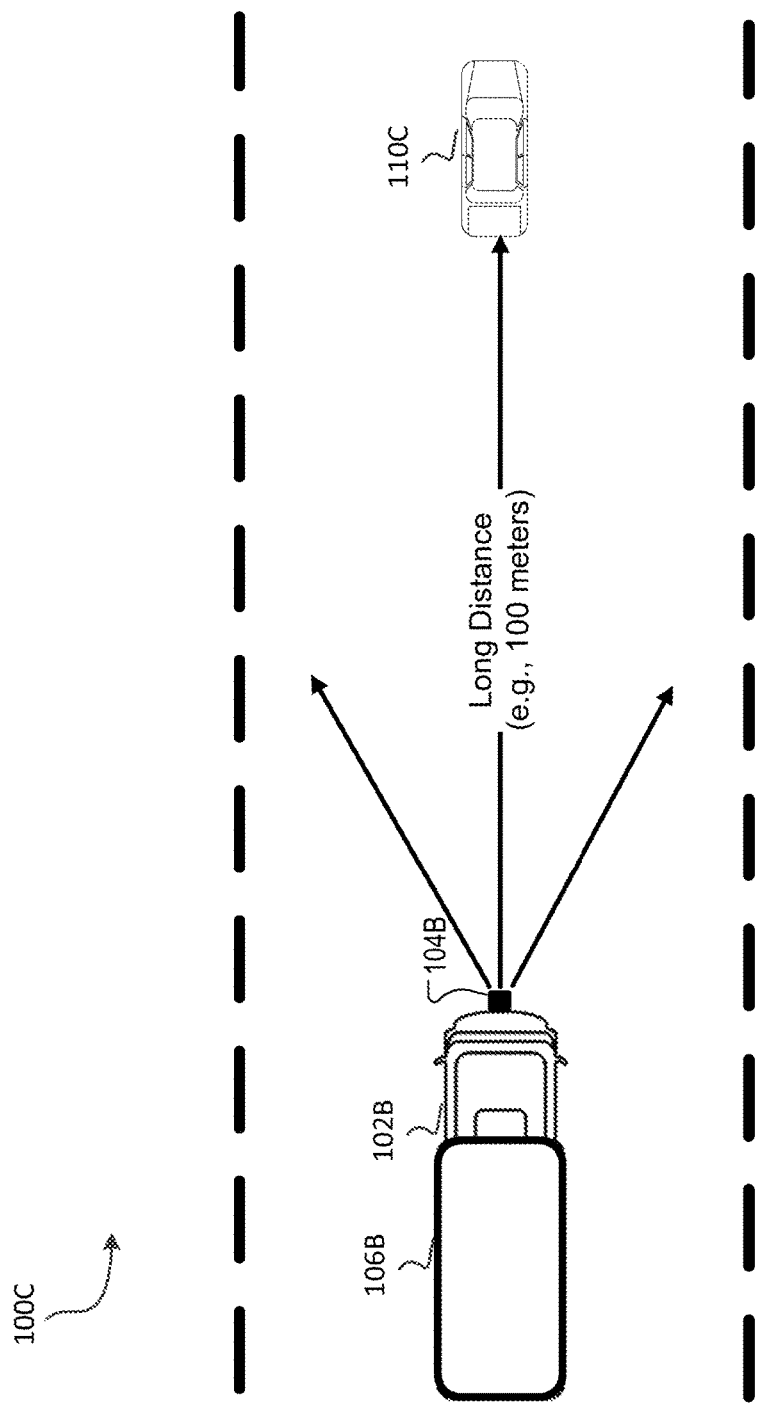
FIG. 1C is a block diagram of an example of a system environment for autonomous commercial trucking vehicles.

FIG. 1C is a block diagram illustrating an example of a system environment for autonomous commercial trucking vehicles, according to some implementations. The environment 100C includes the same components (e.g., commercial truck 102B, cargo 106B, LIDAR system 104B, etc.) that are included in environment 100B.

The environment 100C includes an object 110C (shown in FIG. 1C as another vehicle) that is within a distance range that is (i) more than 30 meters and (ii) equal to or less than 150 meters from the commercial truck 102B. As shown, the LIDAR system 104B in environment 100C may be configured to detect an object (e.g., another vehicle, a bicycle, a tree, street signs, potholes, etc.) at a distance (e.g., 100 meters) from the commercial truck 102B.

Figure 1D:
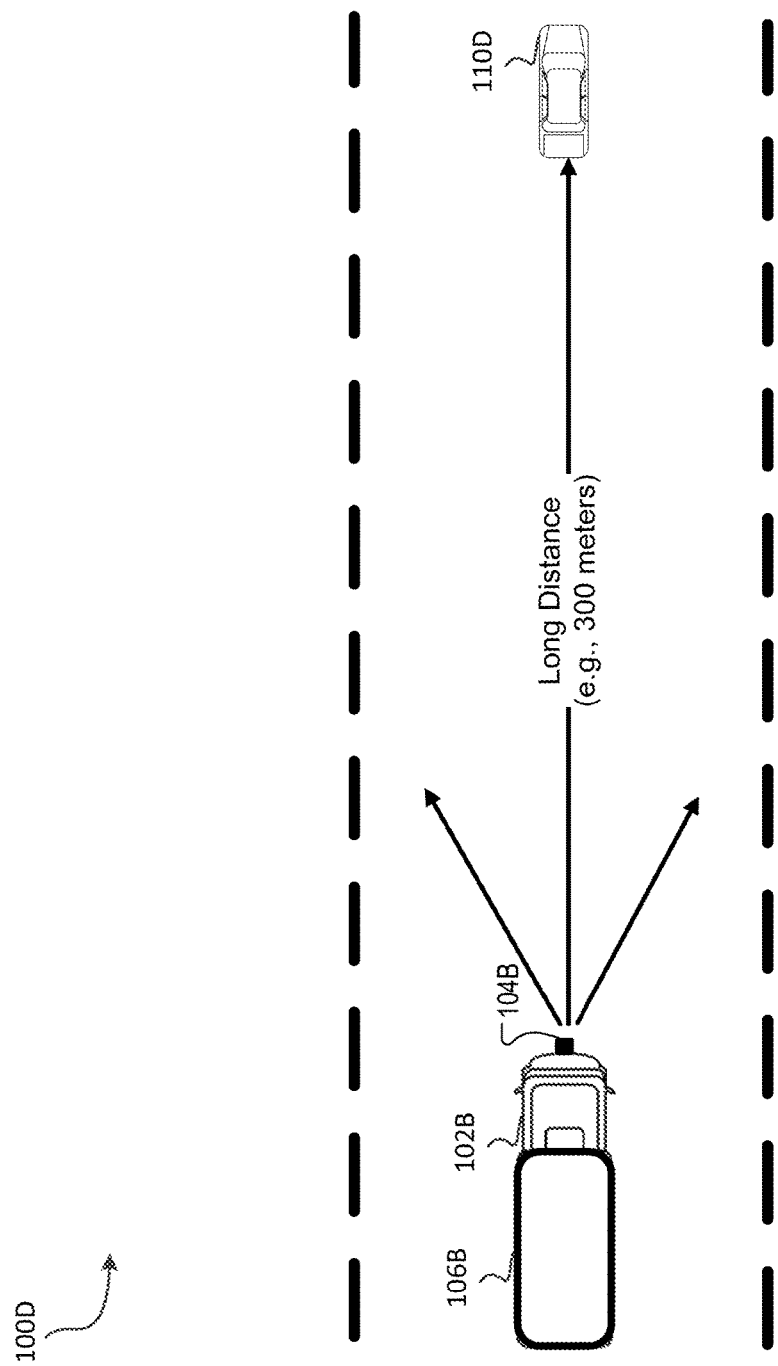
FIG. 1D is a block diagram of an example of a system environment for autonomous commercial trucking vehicles.

FIG. 1D is a block diagram illustrating an example of a system environment for autonomous commercial trucking vehicles, according to some implementations. The environment 100D includes the same components (e.g., commercial truck 102B, cargo 106B, LIDAR system 104B, etc.) that are included in environment 100B.

The environment 100D includes an object 110D (shown in FIG. 1D as another vehicle) that is within a distance range that is more than 150 meters from the commercial truck 102B. As shown, the LIDAR system 104B in environment 100D may be configured to detect an object (e.g., another vehicle, a bicycle, a tree, street signs, potholes, etc.) at a distance (e.g., 300 meters) from the commercial truck 102B.

In commercial trucking applications, it is important to effectively detect objects at all ranges due to the increased weight and, accordingly, longer stopping distance required for such vehicles. FM LIDAR systems (e.g., FMCW and/or FMQW systems) or PM LIDAR systems are well-suited for commercial trucking applications due to the advantages described above. As a result, commercial trucks equipped with such systems may have an enhanced ability to safely move both people and goods across short or long distances, improving the safety of not only the commercial truck but of the surrounding vehicles as well. In various implementations, such FM or PM LIDAR systems can be used in semi-autonomous applications, in which the commercial truck has a driver and some functions of the commercial truck are autonomously operated using the FM or PM LIDAR system, or fully autonomous applications, in which the commercial truck is operated entirely by the FM or LIDAR system, alone or in combination with other vehicle systems.

3. Lidar Systems Using Multiple Scanners

FIG. 2A depicts an example of a LIDAR system 200. The LIDAR system 200 can be used to determine parameters regarding objects, such as range and velocity, and output the parameters to a remote system. For example, the LIDAR system 200 can output the parameters for use by a vehicle controller that can control operation of a vehicle responsive to the received parameters (e.g., vehicle controller 268) or a display that can present a representation of the parameters. The LIDAR system 200 can be used to implement various features and systems described with reference to FIGS. 1A-1D.

The LIDAR system 200 can include a laser source 204 that emits a beam 206, such as a carrier wave light beam. A splitter 208 can split the beam 206 into a beam 210 and a reference beam 212. A modulator 214 can apply modulation such as frequency modulation (e.g., up chirp, down chirp) or phase modulation to generate a beam 216 (e.g., target beam). As depicted in FIG. 2A, the modulator 214 can apply the modulation to the beam 210 subsequent to splitting of the beam 206 by the splitter 208, such that the reference beam 212 is unmodulated (and can be separately modulated in modulator 228), or the modulator 214 can modulate the beam 206 and provide a modulated beam to the splitter 208 for the splitter 208 to split into a target beam and a reference beam.

The beam 216, which is used for outputting a transmitted signal, can have most of the energy of the beam 206 outputted by the laser source 204, while the reference beam 212 can have significantly less energy, yet sufficient energy to enable mixing with a return beam 280 (e.g., returned light) scattered from an object. The reference beam 212 passes through a reference path 232 and can be directed to a detector array 236. The detector array 236 can include one or more detectors for detecting signals corresponding to the return beam 280 (e.g., with the light reflected or otherwise scattered by the object). The detector array 236 can be a single paired or unpaired detector or a 1 dimensional (1D) or 2 dimensional (2D) array of paired or unpaired detectors arranged in a plane roughly perpendicular to returned beams 280 from the object. The reference beam 212 and the return beam 280 can be combined in at least one optical mixer 240 to produce an optical signal of characteristics to be properly detected. The frequency, phase or amplitude of the interference pattern, or some combination, can be recorded by acquisition system 244 for each detector at multiple times during a signal duration of the beam 216.

The reference path 232 can introduce a predetermined delay sufficient for the reference beam 212 to arrive at the detector array 236 with the return beam 280 within a spread of ranges of interest. The reference beam 212 can be a local oscillator (LO) signal. The reference beam 212 can be caused to arrive with the return beam 280 by at least one of: 1) putting a mirror in the scene to reflect a portion of the beam 226 back at the detector array 236 so that path lengths are well matched; 2) using a fiber delay to closely match the path length and broadcast the reference beam 212 with optics near the detector array 236, with or without a path length adjustment to compensate for the phase or frequency difference observed or expected for a particular range; or, 3) using a frequency shifting device (acousto-optic modulator) or time delay of a local oscillator waveform modulation (e.g., in modulator 228) to produce a separate modulation to compensate for path length mismatch. The object may be close enough and the transmitted duration long enough that the return beam 280 sufficiently overlaps the reference beam 212 without a delay.

The LIDAR system 200 can include a processing system 260, which can be implemented using features of the vehicle control system 120 of FIG. 1A. The processing system 260 can process data received regarding the return beam 280 to determine parameters regarding the object such as range and velocity. The processing system 260 can include a scanner controller 264 that can provide scanning signals to control operation of first scanner 220 and second scanner 224 as described further herein, such as to control angle modulation performed by at least one of first scanner 220 or second scanner 224. The processing system 260 can include a Doppler compensator (not shown) that can determine the sign and size of a Doppler shift associated with processing the return beam 280 and a corrected range based thereon along with any other corrections. The processing system 260 can include a modulator controller (not shown) that can send one or more electrical signals to drive modulators 214, 228.

The processing system 260 can include or be communicatively coupled with a vehicle controller 268 to control operation of a vehicle for which the LIDAR system 200 is installed (e.g., to provide complete or semi-autonomous control of the vehicle). For example, the vehicle controller 268 can be implemented by at least one of the LIDAR system 200 or control circuitry of the vehicle. The vehicle controller 268 can control operation of the vehicle responsive to at least one of a range to the object or a velocity of the object determined by the processing system 260. For example, the vehicle controller 268 can transmit a control signal to at least one of a steering system or a braking system of the vehicle to control at least one of speed or direction of the vehicle.

The LIDAR system 200 includes at least a first scanner 220 and a second scanner 224 (e.g., scanning optics). The first scanner 220 can receive the beam 216 and modify the beam 216, such as to adjust an angle of the beam 216, to output a beam 222. The second scanner 224 can receive the beam 222 and modify the beam 222, such as to adjust an angle of the beam 222, to output a beam 226. In some implementations, the first scanner 220 can perform relative small, rapid adjustments to the angle of the beam 216 to output the beam 222, as compared to adjustments performed by the second scanner 224.

Figure 2B:
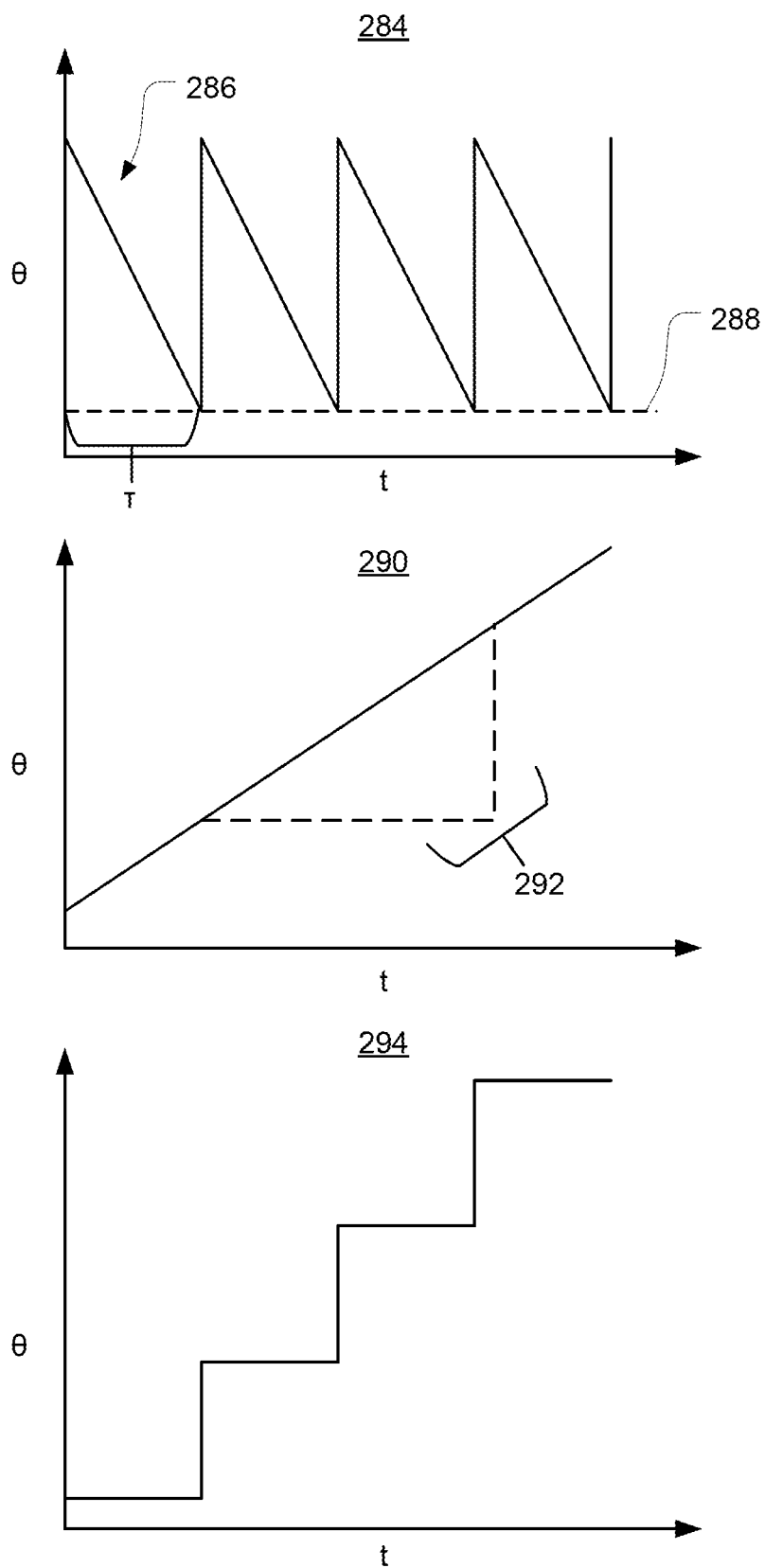
FIG. 2B is a chart of an example of angle profiles of light beams achieved using a LIDAR system.

FIG. 2B depicts an example of an angle profile 284 of angle modulation that the first scanner 220 applies to the beam 216 to output the beam 222, an angle profile 290 of angle modulation that the second scanner 224 applies to the beam 222 to output the beam 226, and a resulting angle profile 294 of the beam 226. While FIG. 2B depicts the angle profiles 284, 290, 294 as being continuous, the angle profiles 284, 290, 294 can be discrete points, such as if at least one of the first scanner 220 or the second scanner 224 is configured to discretely (e.g., randomly) modulate the angles of the respective beams 216, 222.

The first scanner 220 controls an angle θ (e.g., azimuth angle) of the received beam 216 in order to output the beam 222. The first scanner 220 can control the angle θ by applying a first angle modulation 286 to the beam 216 over a characteristic time τ of three microseconds. The first angle modulation 286 can be greater than 0.02 degrees and less than 0.32 degrees. The first angle modulation 286 can be greater than 0.04 degrees and less than 0.16 degrees. The first angle modulation 286 can be 0.08 degrees. As depicted in FIG. 2B, the first scanner 220 can perform a sequence of first angle modulations 286, between which the first scanner 220 sets the angle θ (back) to a baseline 288.

The second scanner 224 controls an angle (e.g., azimuth angle) of the received beam 222 in order to output the beam 226. The second scanner 224 can have a relatively high slew rate (e.g., compared to the first scanner 220). The slew rate can represent a rate of electrical current or voltage change of input to the second scanner 224 (e.g., from processing system 260) responsive to which the second scanner 224 controls the angle of the received beam 222. As depicted in FIG. 2B, the second scanner 224 can adjust the angle θ over a time scale that is relatively long compared to the characteristic time τ, such as exceeding on the order of one thousand degrees per second. The second scanner 224 can adjust the angle θ of the received beam 222 at a rate 292 (of angle as a function of time) that is within a threshold value of equal to and opposite the first angle modulation 286 divided by the characteristic time τ, such that the angle θ of the beam 226 remains level (e.g., does not change more than a threshold value relative to an initial value) during the period in which the first scanner 220 is performing the first angle modulation 286.

The resulting angle profile 294 of the beam 226, as depicted in FIG. 2B, can be analogous to a step function over a plurality of cycles of modulations by the first scanner 220 and the second scanner 224. The angle profile 294 can define an angle θ of the beam 226 that remains level (e.g., remains within a threshold value of an initial value) during the characteristic time τ during which the first scanner 220 performs the first angle modulation 286. The angle θ of the beam 226 can increase between instances of the first angle modulation 286 in which the signs of the angle modulations performed by the first scanner 220 and the second scanner 224 are not opposite (e.g., the angles θ of the beams 216, 222 are both increasing at the same time). By back-scanning the beam 226 according to the angle profile 294, the LIDAR system 200 can more effectively relate the beam 226 with a return beam in order to determine parameters of the object from which the return beam is returned.

Figure 3:
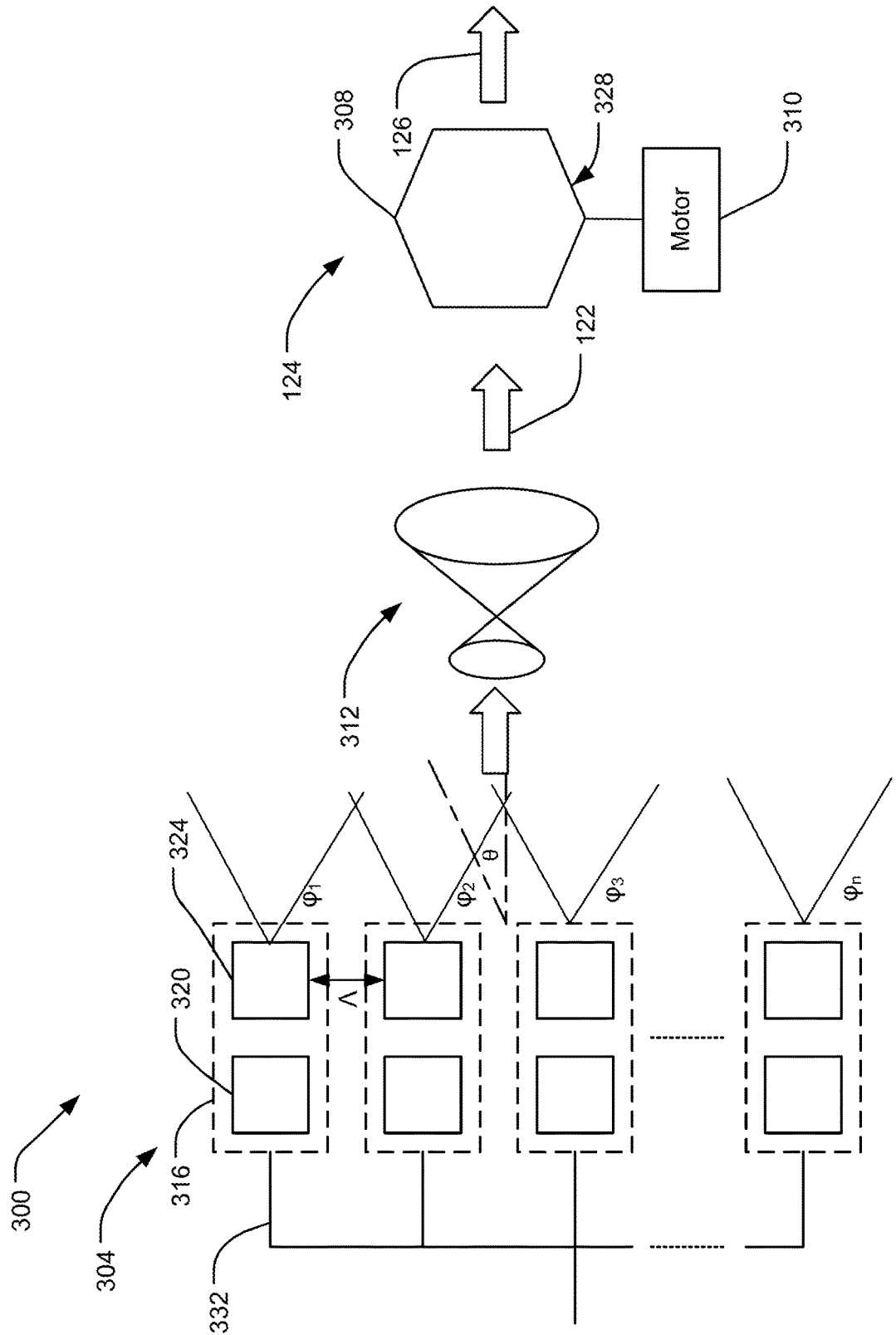
FIG. 3 is a block diagram of an example of a LIDAR system that includes an optical phased array.

FIG. 3 depicts an example of scanning optics 300 including an optical phased array 304 (e.g., first scanning device) and a second scanner 224. The optical phased array 304 and second scanner 224 can be used to implement the first scanner 220 and second scanner 224, respectively, of the LIDAR system 200. For example, the scanning optics 300 can be used to transmit a beam having the angle profile 294 depicted in FIG. 2B.

The scanning optics 300 can include at least one lens 312 between the optical phased array 304 and the second scanner 224. The at least one lens 312 can be a telescope, such as an arrangement of a plurality of optical elements such as a lens, a mirror, or combinations thereof, such as to increase the size of the beam 222. The at least one lens 312 can receive the beam 222 from the optical phased array 304 and output the beam 222 to the second scanner 224. The at least one lens 312 can adjust a size of the beam 222, such as to increase the size of the beam 222, so that the optical phased array 304 can be sized smaller than the second scanner 224. The at least one lens 312 can include a cylindrical lens to facilitate steering of the beam 222.

The optical phased array 304 can include a plurality of emitters 316. Each emitter 316 can include a phase shifter 320 coupled with a radiating element 324. The emitter 316 can receive input light from a light source (e.g., receive beam 216 as described with reference to FIGS. 2A and 2B) through an optical fiber 332 of a plurality of optical fibers 332. For example, the optical fibers 332 can be coupled with the modulator 214 to receive the beam 216 from the modulator 214 and output the beam 216 to each of the emitters 316. The emitters 316 can be arranged as a one-dimensional or a two-dimensional array. As an example, the emitters 316 can be arranged as a two-dimensional array having sixteen emitters 316 in each row (which can be used to perform azimuthal angle scanning) and one thousand emitters 316 in each column (which can be used to perform vertical, elevation angle scanning).

The emitters 316 can emit light having a phase φ (e.g., respective phases $\varphi_1, \varphi_2, \ldots$ as depicted in FIG. 3). The light from one or more emitters 316 can combine (e.g., superimpose) to form the beam 222 outputted from the optical phased array 304. The phase shifter 320 can control the phase φ of the received beam 216. For example, the phase shifter 320 can control the phase φ responsive to a control signal (e.g., from processing system 160). By controlling the phase shifters 320, the optical phased array 304 can be controlled to randomly determine the angle θ of the outputted beam 222.

The angle θ of the outputted beam 222 can be based on a wavelength λ, of the light of the beam 216, a spacing Λ between emitters 316, and a phase difference dφ (e.g., $\varphi_2-\varphi_1$, etc.) between phases of light outputted by the emitters 316. For example, the angle θ can be defined as:

$$\theta = \frac{\lambda}{\Lambda} d\varphi.$$

By using the optical phased array 304, the angle θ can be achieved while having a relatively large spacing Λ, which can reduce the number of emitters 316 needed.

Figure 4:
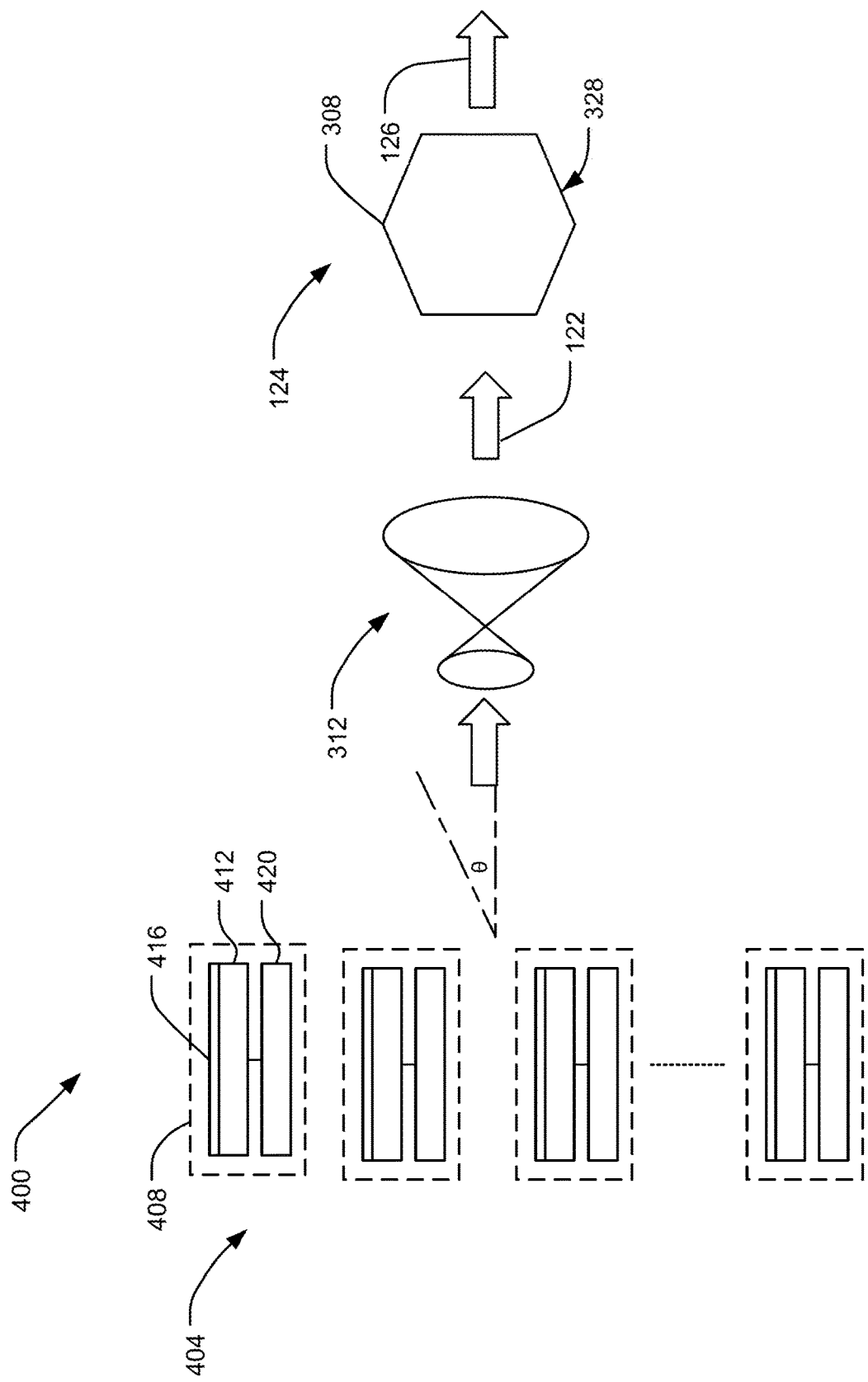
FIG. 4 is a block diagram of an example of a LIDAR system that includes a micro-electromechanical system (MEMS) phased array.

FIG. 4 depicts an example of scanning optics 400 including a micro-electromechanical system (MEMS) phased array 404 and the second scanner 224. The MEMS phased array 404 can receive the beam 216 and modulate the angle of the beam 216 to output the beam 222. The scanning optics 400 can include the lens(es) 312, which can direct the beam 222 to the second scanner 224.

The MEMS phased array 404 can include a plurality of emitters 408. Each emitter 408 can be controlled to adjust an angle of light outputted by the emitter 408, such that light emitted by the plurality of emitters 408 can combine (e.g., superimpose) to control the angle θ of the beam 222.

The emitter 408 can include an electrostatic plate actuator 412 coupled with a mirror 416. The mirror 416 can be defined by a surface of the electrostatic plate actuator 412, or can be a separate reflective material or component fixed to the electrostatic plate actuator 412. A voltage can be applied to the electrostatic plate actuator 412 to rotate the electrostatic plate actuator 412, which can modulate a pitch of the mirror 416. By controlling the pitch of the mirror 416, a path length of light (e.g., of the beam 216) that interacts with the emitter 408 can be changed, steering the light as it is outputted by the emitter 408. The electrostatic plate actuator 412 can be coupled with a mechanical biasing element 420 (e.g., spring) that biases the position of the electrostatic plate actuator 412 to a predetermined position.

Figure 5:
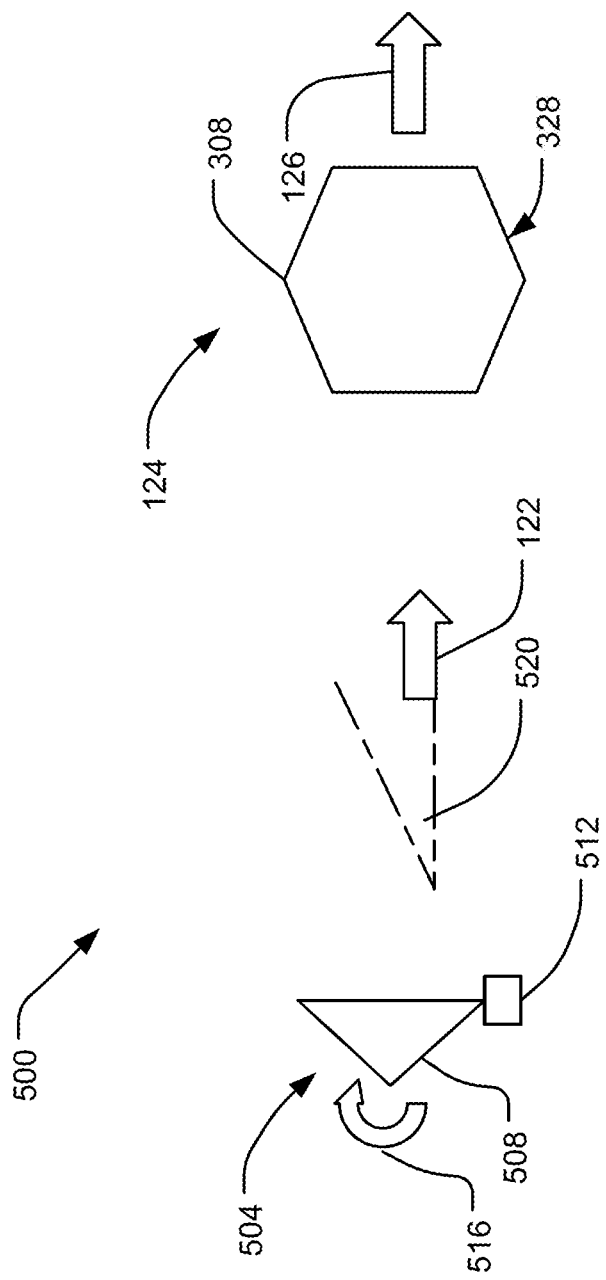
FIG. 5 is a block diagram of an example of a LIDAR system that includes a MEMS mirror scanner.

FIG. 5 depicts an example of scanning optics 500 including a MEMS mirror scanner 504 and the second scanner 224. The MEMS mirror scanner 504 can receive the beam 216 and modulate the angle of the beam 216 to output the beam 222. The scanning optics 500 can include the at least one lens 312 (see, e.g., FIG. 3), which can direct the beam 222 to the second scanner 224.

The MEMS mirror scanner 504 can include a MEMS mirror 508 and a driver 512 (e.g., an actuator). The MEMS mirror 508 can have a resonant frequency $f_{MEMS}$ at which it can be driven by the driver 512 to cause the MEMS mirror 508 to rotate over an angle range 516 to modulate the angle of the beam 216 to output the beam 222. For example, the MEMS mirror 508 can have a resonant frequency of 50 kHz.

The MEMS mirror 508 can rotate over the angle range 516 to perform a first angle modulation 520 of the beam 222, which can be analogous to the first angle modulation 286 described with reference to FIG. 2B. The MEMS mirror 508 can be shaped or configured such that the angle range 516 corresponds to the first angle modulation 520. For example, the MEMS mirror 508 can be configured such that the angle range 516 is 0.5 degrees to achieve the first angle modulation 520 (e.g., to achieve a 0.08 degree modulation of the beam 222).

Figure 6:
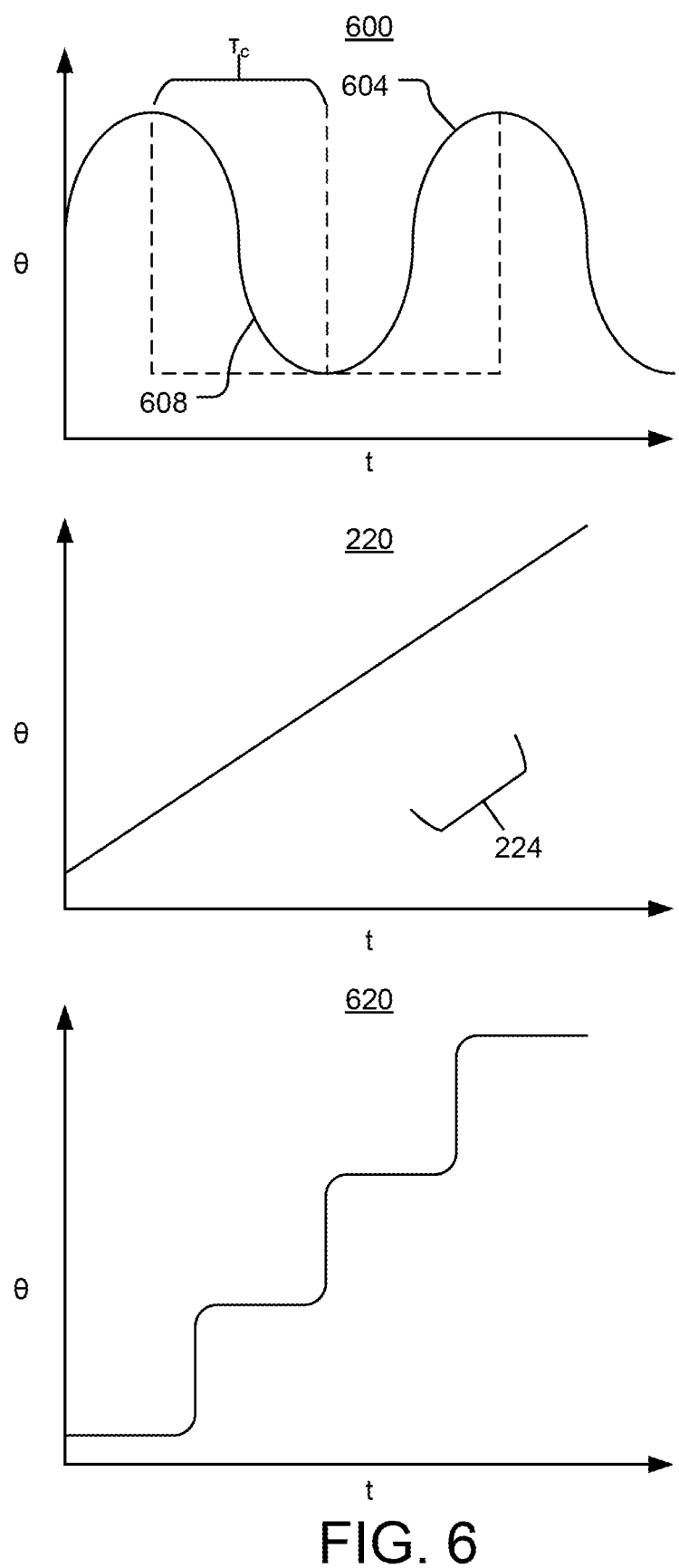
FIG. 6 is a chart of an example of angle profiles of light beams achieved using the LIDAR system of FIG. 5.

FIG. 6 depicts an angle profile 600 of angle modulation performed by the MEMS mirror 508, the angle profile 290 performed by the second scanner 224, and a resulting angle profile 620 of the beam 226. As depicted in FIG. 6, the angle profile 600 can be sinusoidal due to the pivoted rotation of the MEMS mirror 508. The angle profile 600 can define a first portion 604, a second portion 608, and a characteristic time $\tau_c$. The second portion 608 can correspond to a portion of output of the beam 226 over time based on which useful return data can be received (e.g., during which the resulting angle profile 620 is relatively level). The characteristic time $\tau_c$ can be inversely proportional to the frequency $f_{MEMS}$ at which the driver 512 causes the MEMS mirror 508 to rotate, such that as the frequency $f_{MEMS}$ increases, the characteristic time $\tau_c$ decreases. The characteristic time $\tau_c$ can be greater than or equal to two microseconds and less than or equal to ten microseconds.

The characteristic time $\tau_c$ can be related to a range that can be achieved using the scanning optics 500:

$$\tau_c > \tau_{int} + \tau_{delay} > \frac{2R}{c}$$

where $\tau_{int}$ is an integration time corresponding to processing the return beam, such as for determining range or velocity of an object corresponding to the return beam, $\tau_{delay}$ is a delay time associated with overhead in the signal processing pathway, R is a design range of the scanning optics 500 (e.g., of a LIDAR system 200 that implements the scanning optics 500), and c is the speed of light. As such, the maximum range of the scanning optics 500 can increase as the frequency $f_{MEMS}$ decreases (increasing the characteristic time $\tau_c$), which can enable the scanning optics 500 to be used for scanning at long range (e.g., beyond 300 meters). Design parameters such as the maximum range, pulse repetition rate, and effective duty cycle can be determined based on selection of the frequency $f_{MEMS}$ (e.g., based on material selection of the MEMS mirror 508).

Figure 7:
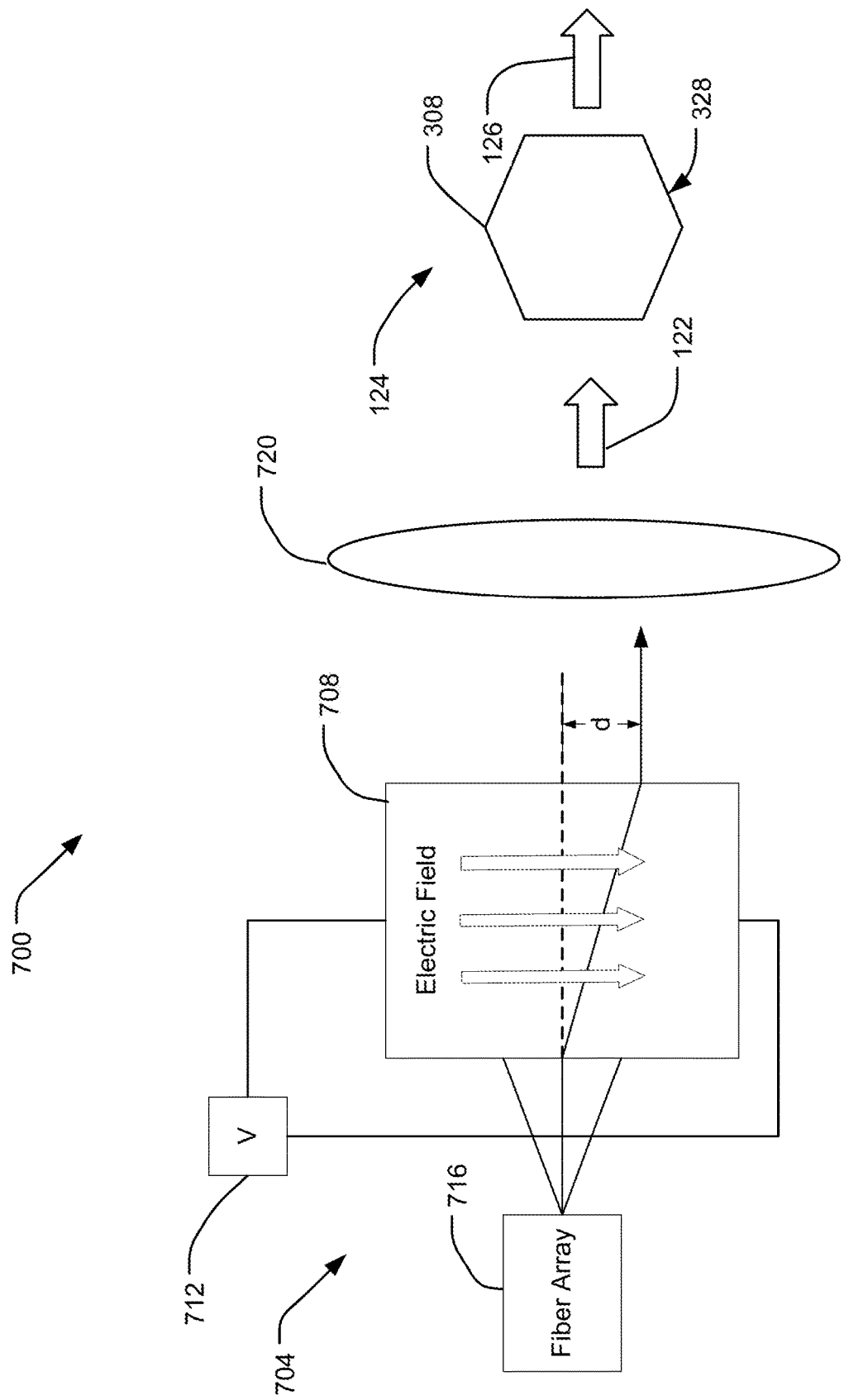
FIG. 7 is a block diagram of an example of a LIDAR system that includes an electro-optic (EO) scanner.

FIG. 7 depicts an example of scanning optics 700 including an electro-optic (EO) scanner 704 and the second scanner 224. The EO scanner 704 can receive the beam 216 and modulate the angle of the beam 216 to output the beam 222. The scanning optics 700 can include the at least one lens 312 (see, e.g., FIG. 3), which can direct the beam 222 to the second scanner 224.

The EO scanner 704 can include an EO crystal 708 coupled with a voltage source 712. The EO crystal 708 can receive the beam 216 through a fiber array 716 (which may be coupled with a component of the LIDAR system 200, such as the modulator 214, to receive the beam 216). The scanning optics 700 can include a collimator 720 that receives the beam 222 from the EO crystal 708 and collimates the beam 222 for reception by the second scanner 224.

The EO crystal 708 can include a crystal material for which a refractive index changes based on a change in electric field. For example, responsive to the voltage source 712 applying a voltage to the EO crystal 708, a direction of light passing through the EO crystal 708 can be displaced by a displacement d, such that the EO scanner 704 can adjust the direction of the beam 216 to output the beam 222 at the angle θ based on the voltage applied by the voltage source 712. The displacement d can be proportional to the voltage applied by the voltage source 712, enabling the EO scanner 704 to control the angle θ of the beam 222.

Figure 8:
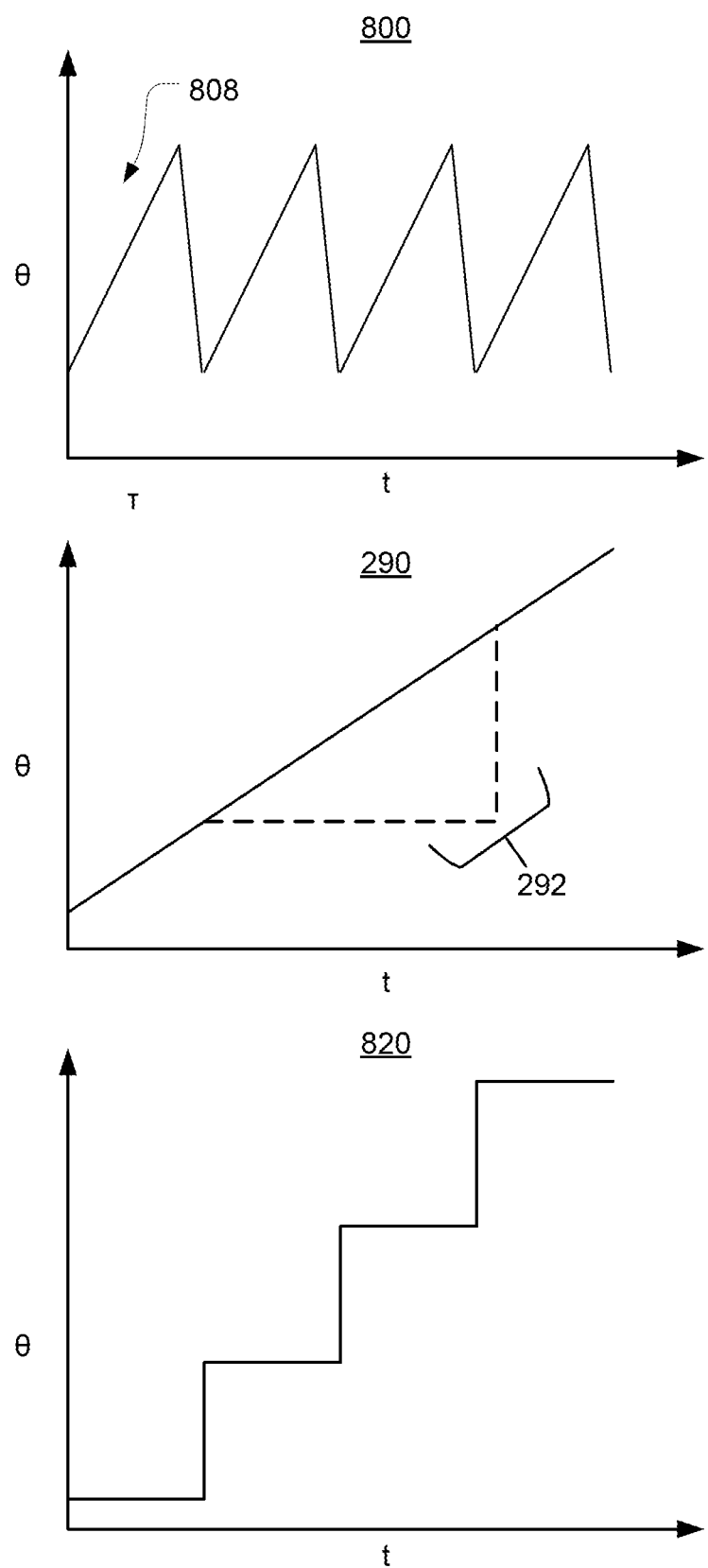
FIG. 8 is a chart of an example of angle profiles of light beams achieved using the LIDAR system of FIG. 7.

FIG. 8 depicts an angle profile 800 of angle modulation performed by the EO scanner 704, the angle profile 290 performed by the second scanner 224, and a resulting angle profile 820 of the beam 226. As depicted in FIG. 8, an angle modulation 808 can be applied (by controlling the voltage applied by the voltage source 712) to control the angle θ of the beam 222. The angle modulation 808 can be greater than 0.02 degrees and less than 0.32 degrees. The angle modulation 808 can be greater than 0.04 degrees and less than 0.16 degrees. The angle modulation 808 can be 0.08 degrees.

Referring further to FIGS. 2A and 3, the second scanner 224 is depicted as a polygon scanner 308. The polygon scanner 308 can include a plurality of facets 328 that receive the beam 222 from the optical phased array 304 and output the beam 222 as the beam 226. For example, the facet 328 can include a reflective (or refractive) surface to reflect (or refract) the beam 222 as the beam 226. The optical phased array 304 can be positioned within the polygon scanner 308. Accordingly, the polygon scanner 308 can be used to perform angle modulation of the beam 222 to achieve the angle profile 294 depicted in FIG. 2B for the beam 226.

The scanning optics 300 can include a motor 310 that rotates the polygon scanner 308. The motor 310 can rotate the polygon scanner 308 at a rate of rotation corresponding to the angle modulation performed over the characteristic time by the optical phased array 304, such that the scanning optics 300 can achieve a backscanned profile for the angle of the beam 226.

The second scanner 224 can be a galvanometer (e.g., mirror galvanometer). The galvanometer can be controlled to reflect the beam 222 to output the beam 226 (e.g., responsive to a control signal from processing system 260). The second scanner 224 can be similar to the MEMS phased array 404 or the MEMS mirror 508, but having at least one of a size or configuration such that the second scanner 224 can achieve angle control of a relatively large magnitude (e.g., angle profile 290 described with reference to FIG. 2B).

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A light detection and ranging (LIDAR) system, comprising:
   a laser source;
   a first scanner that receives a first beam from the laser source and modulates the first beam to output a second beam at a first angle in a plane at a first point in time and at a second angle in the plane at a second point in time; and
   a second scanner that receives the second beam and modulates the second beam to output a third beam at a third angle in the plane at a third point in time and at a fourth angle in the plane at a fourth point in time.

2. The LIDAR system of claim 1, wherein the first scanner modulates the first beam during a plurality of cycles and the second scanner modulates the second beam during the plurality of cycles such that the third angle of the third beam forms a step function.

3. The LIDAR system of claim 1, further comprising a telescope between the first scanner and the second scanner.

4. The LIDAR system of claim 1, wherein the first scanner comprises an optical phased array comprising a plurality of emitters that receive the first beam and apply respective phase modulations to the first beam to output the second beam at the first angle and the second angle.

5. The LIDAR system of claim 1, wherein the first scanner comprises a micro-electromechanical system (MEMS) phased array comprising a plurality of emitters comprising an electrostatic plate actuator coupled with a mirror, the electrostatic plate actuator rotates responsive to a control signal to control a path length of light through the emitter such that the plurality of emitters output the second beam at the second angle.

6. The LIDAR system of claim 1, wherein the first scanner comprises a MEMS mirror having a resonant frequency, and driving the MEMS mirror at the resonant frequency causes the MEMS mirror to modulate the first beam.

7. The LIDAR system of claim 1, wherein the first scanner comprises an electro-optical (EO) crystal coupled with a voltage source, and wherein the voltage source is configured to apply a voltage to the EO crystal to displace the first beam as the first beam passes through the EO crystal to cause the second beam to be outputted at the first angle.

8. The LIDAR system of claim 1, wherein the second scanner comprises at least one of:
   a polygon scanner comprising a plurality of facets, each facet of the plurality of facets configured to reflect or refract the second beam to output the third beam at the third angle; or
   a mirror galvanometer.

9. The LIDAR system of claim 1, wherein the plane is an azimuthal plane.

10. The LIDAR system of claim 1, wherein the first scanner is configured to output the second beam between the first angle and the second angle using angle modulation greater than or equal to 0.02 degrees per second and less than or equal to 0.32 degrees per second during a characteristic time of 3 microseconds.

11. An autonomous vehicle control system, comprising:
    a first scanner that receives a first beam from the laser source and modulates the first beam to output a second beam at a first angle in a plane at a first point in time and at a second angle in the plane at a second point in time; and
    a second scanner that receives the second beam and modulates the second beam to output a third beam at a third angle in the plane at a third point in time and at a fourth angle in the plane at a fourth point in time;
    one or more detectors that receive a return beam from an object responsive to the third beam and output a signal responsive to the return beam; and
    one or more processors configured to:
       determine at least one of a range to or a velocity of the object using the signal; and
       control operation of an autonomous vehicle responsive to the at least one of the range or the velocity.

12. The autonomous vehicle control system of claim 11, further comprising:
    the laser source that generates the first beam; and
    a modulator that applies at least one of frequency modulation or phase modulation to the first beam to provide the first beam to the first scanner.

13. The autonomous vehicle control system of claim 11, wherein the one or more processors are configured to control operation of the vehicle using at least one of a steering system or a braking system of the autonomous vehicle.

14. The autonomous vehicle control system of claim 11, wherein the first scanner modulates the first beam during a plurality of cycles and the second scanner modulates the second beam during the plurality of cycles such that the third angle of the third beam forms a step function.

15. The autonomous vehicle control system of claim 11, wherein the plane is an azimuthal plane.

16. The autonomous vehicle control system of claim 11, wherein the first scanner is configured to output the second beam between the first angle and the second angle using angle modulation greater than or equal to 0.02 degrees per second and less than or equal to 0.32 degrees per second during a characteristic time of 3 microseconds.

17. An autonomous vehicle, comprising:
    a LIDAR system comprising:
       a laser source;
       a first scanner that receives a first beam from the laser source and modulates the first beam to output a second beam at a first angle in a plane at a first point in time and at a second angle in the plane at a second point in time; and a second scanner that receives the second beam and modulates the second beam to output a third beam at a third angle in the plane at a third point in time and at a fourth angle in the plane at a fourth point in time; and at least one of a steering system or a braking system; and a vehicle controller comprising one or more processors configured to:
- receive a signal from an object responsive to the third beam;
- determine at least one of a range to or a velocity of the object using the signal; and
- control operation of the at least one of the steering system or the braking system responsive to the at least one of the range or the velocity.

18. The autonomous vehicle of claim 17, wherein the first scanner modulates the first beam during a plurality of cycles and the second scanner modulates the second beam during the plurality of cycles such that the third angle of the third beam forms a step function.

19. The autonomous vehicle of claim 17, wherein the plane is an azimuthal plane.

20. The autonomous vehicle of claim 17, wherein the first scanner is configured to output the second beam between the first angle and the second angle using angle modulation greater than or equal to 0.02 degrees per second and less than or equal to 0.32 degrees per second during a characteristic time of 3 microseconds.

* * * * *